United States Patent [19]

Tipon et al.

[11] Patent Number: 5,859,962
[45] Date of Patent: Jan. 12, 1999

[54] AUTOMATED VERIFICATION OF DIGITAL DESIGN

[75] Inventors: Donald G. Tipon, San Diego; Steven J. Schlesinger, Escondido; Chinh Kim Nguyen; Darrin J. Marshall, both of San Diego, all of Calif.

[73] Assignee: NCR Corporation, Dayton, Ohio

[21] Appl. No.: 576,655

[22] Filed: Dec. 21, 1995

[51] Int. Cl.$^6$ ................................................. G06F 11/00
[52] U.S. Cl. .................. 395/183.09; 395/500; 371/27.4
[58] Field of Search ........................ 395/183.04, 183.01, 395/185.08, 183.09, 183.13, 500, 920; 371/22.1, 24, 25.1, 26, 27, 27.1, 27.4

[56] References Cited

U.S. PATENT DOCUMENTS

| | | | |
|---|---|---|---|
| 4,873,705 | 10/1989 | Johnson | 371/21.2 |
| 4,937,765 | 6/1990 | Shupe | 364/570 |
| 5,247,651 | 9/1993 | Clarisse | 395/500 |
| 5,299,202 | 3/1994 | Vaillancourt | 371/11.1 |
| 5,325,309 | 6/1994 | Halaviati | 364/488 |
| 5,345,450 | 9/1994 | Saw et al. | 395/183.09 |
| 5,410,548 | 4/1995 | Millman | 371/23 |
| 5,426,770 | 6/1995 | Nuber | 395/500 |
| 5,446,742 | 8/1995 | Vahabi | 371/27 |
| 5,485,471 | 1/1996 | Bershteyn | 371/27 |
| 5,513,344 | 4/1996 | Nakamura | 395/185.18 |
| 5,561,762 | 10/1996 | Smith et al. | 395/183.09 |
| 5,572,666 | 11/1996 | Whitman | 395/183.08 |
| 5,581,739 | 12/1996 | FitzPatrick | 395/183.09 |
| 5,583,786 | 12/1996 | Needham | 364/488 |
| 5,586,046 | 12/1996 | Feldbaumer | 364/490 |
| 5,633,879 | 5/1997 | Potts et al. | 371/25.1 |

*Primary Examiner*—Albert Decady
*Attorney, Agent, or Firm*—Gregory A. Welte

[57] ABSTRACT

A system for verifying design of a digital system. A digital system, which receives input vectors and produces output vectors, is simulated. The invention generates a sequence of synthesized input vectors, and applies them to the simulated system. These input vectors cause changes in internal variables, and the output vectors. The invention also independently computes the values which internal variables and output vectors are expected to assume. The invention then compares the simulated internal and output variables with the computed values. If they agree, the simulation is assumed to function properly.

5 Claims, 7 Drawing Sheets

FIG. 2

INPUT 4 IN FIG 1: VECTOR #1

| OUTPUT: | VECTOR A VALUE | VECTOR E VALUE |
|---|---|---|
| | VECTOR B VALUE | VECTOR F VALUE |
| | VECTOR C VALUE | VECTOR G VALUE |
| | VECTOR D VALUE | VECTOR H VALUE |

INPUT 4 IN FIG 1: VECTOR #2

| OUTPUT: | VECTOR A VALUE | VECTOR E VALUE |
|---|---|---|
| | VECTOR B VALUE | VECTOR F VALUE |
| | VECTOR C VALUE | VECTOR G VALUE |
| | VECTOR D VALUE | VECTOR H VALUE |

INPUT 4 IN FIG 1: VECTOR #3

| OUTPUT: | VECTOR A VALUE | VECTOR E VALUE |
|---|---|---|
| | VECTOR B VALUE | VECTOR F VALUE |
| | VECTOR C VALUE | VECTOR G VALUE |
| | VECTOR D VALUE | VECTOR H VALUE |

⋮

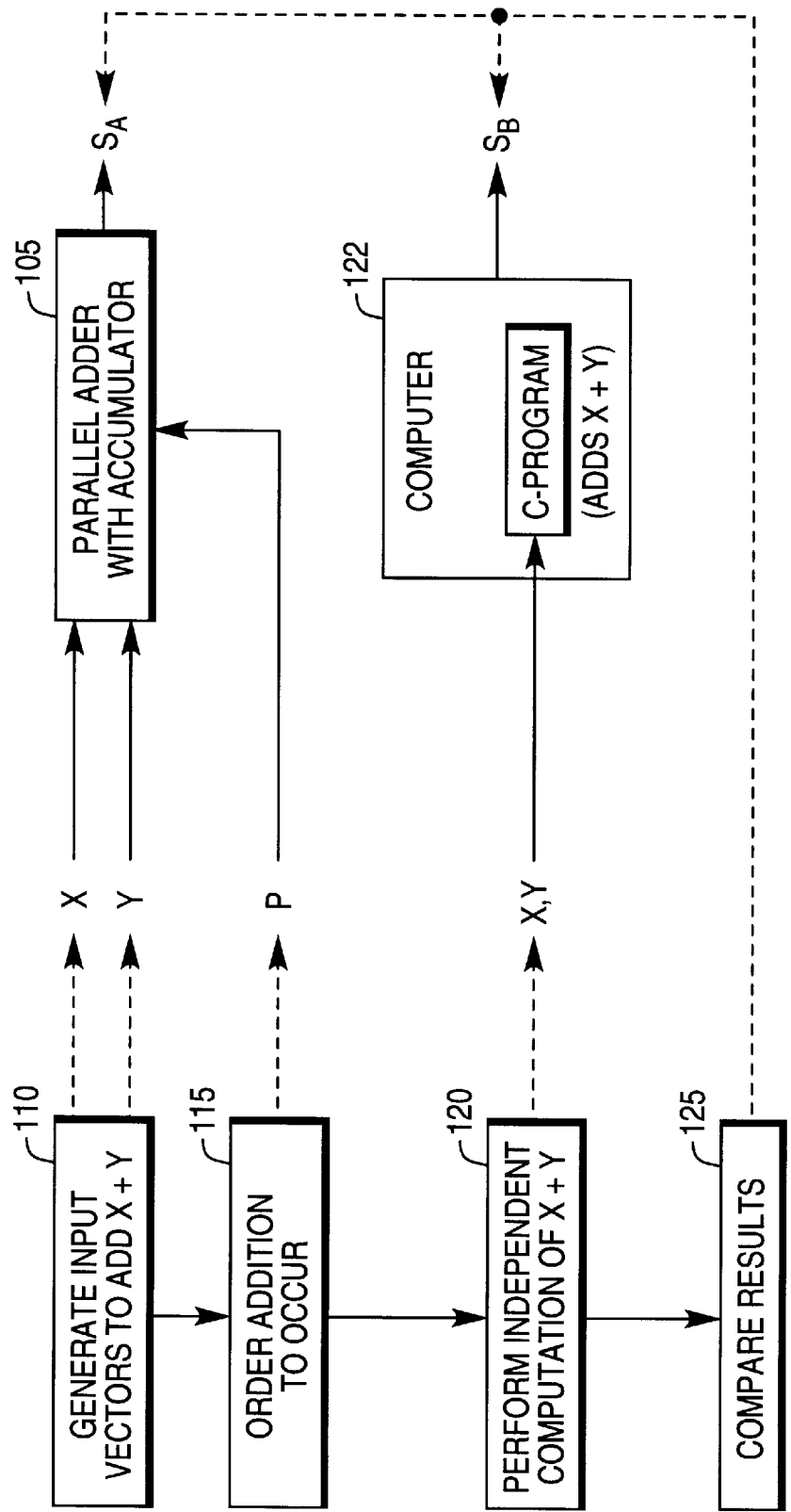

AUTOMATED VERIFICATION OF DIGITAL DESIGN

The invention concerns systems for verification of the operation of digital systems at the design stage, prior to commitment of the design to hardware.

A COMPUTER PROGRAM LISTING is attached (Appendix A).

BACKGROUND OF THE INVENTION

Modern digital systems are commonly simulated in software, in order to assure proper functioning, prior to actual fabrication in hardware. However, as digital systems become more complex, the simulation itself can also become quite complex.

The increased complexity can cause several phenomena. One is that the number of states within the system can become so large that even a simulation cannot test all possible states. That is, the system response to all possible inputs cannot be checked. A second is that, even if a reduced set of inputs is used, the reduced set can produce so much data that analysis by humans becomes impractical.

OBJECTS OF THE INVENTION

An object of the invention is to provide an improved automated digital simulation system.

SUMMARY OF THE INVENTION

In one form of the invention, a user specifies types of operations to be tested in a simulated system. The invention tests these selected operations in a random manner. Further, the invention independently computes the results which the operations should produce. The invention then compares the computed results with the outputs of the operations.

BRIEF DESCRIPTION OF THE DRAWINGS

FIG. 2 illustrates principal features of a trace file.

FIG. 7 illustrates independent simulation of the binary adder of FIG. 6.

DETAILED DESCRIPTION OF THE INVENTION

This discussion will first give an overview of one form of the invention, and then a detailed examination of selected aspects of the invention.

Overview of Invention

Generation of Input Vectors

Figure 1:
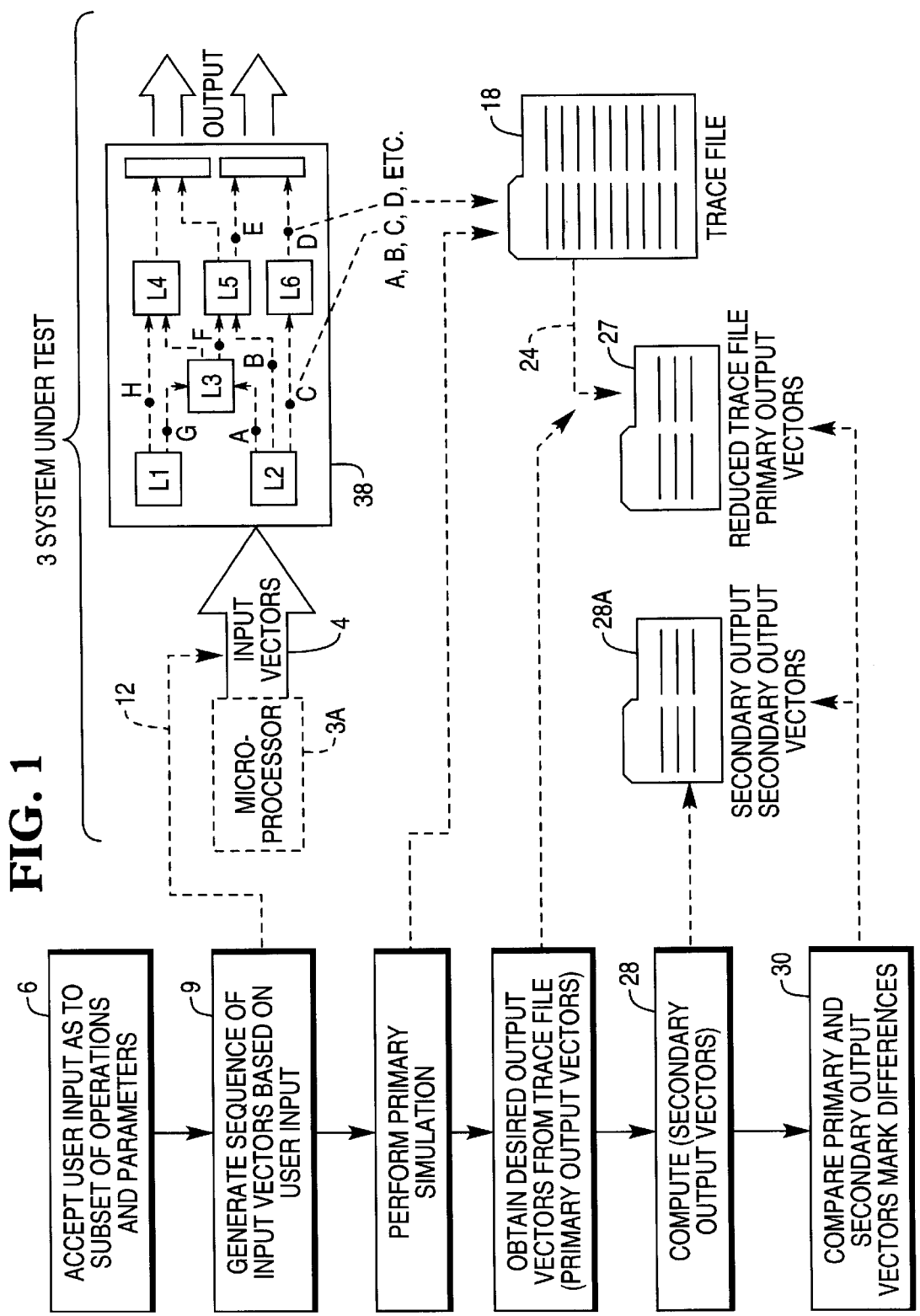
FIG. 1 is a flow chart illustrating one form of the invention, together with a block diagram illustrating steps in the flow chart.

FIG. 1 illustrates a system 3 under test, which, for ease of explanation, is assumed to be a programmable digital computer. The system is shown in two parts:

(1) a microprocessor 3A and
(2) the remaining sub-system 3B.

The microprocessor is shown in phantom, because the microprocessor is not actually used, or tested, by the invention. Instead, the invention (a) simulates the output of the microprocessor, which acts as input for sub-system 3B, and
(b) applies the simulated input vectors to the sub-system 3B, as indicated by input vectors 4.

Sub-system 3B takes the form of a digital simulation of a physical system.

Blocks 6 and 9

Invention Generates Input Vectors

As background regarding the input vectors 4, some aspects of microprocessors will be explained. Microprocessors, in general, execute instruction sets. The instructions in the set specify computational operations, such as addition, multiplication, Boolean operations, and so on. Also, each instruction requires various parameters. For example, in an "add" instruction, the parameters specify the data to be added, and a destination for the sum produced.

Under the invention, a user specifies, in block 6, one or more instructions, or types of bus cycles, which the microprocessor is to execute, together with the required parameters. For example, the user may specify a "load" instruction, wherein a specific data word is to be loaded into a register in the microprocessor. A hypothetical load instruction may be the following:

LOAD 662, 6

This instruction orders the microprocessor to load the data word located at memory address 662 into register number 6.

In addition, in block 6, the user specifies additional data regarding details of execution of the instructions. For example, the user may order that a "copy" command load a specified data word into a range of memory addresses, thereby ordering execution of a multiplicity of copy commands.

However, because the type of testing will be quite extensive, involving numerous parameters and commands, the invention does not require that the user engage in programming which generates the desired sequence of instructions. Instead, block 6 requires that the user only specify, in general terms, the type of instructions to be executed. In response, the invention generates the proper sequence of input vectors, as indicated in block 9, which match those which the microprocessor would produce, if executing the same instructions specified in block 6. These input vectors are applied to the sub-system 3B, as indicated by arrow 12.

A significant feature of the input vectors is that the user is not required to become involved in the details of the vector generation. The invention assumes the burden of generating a sequence of vectors, in response to the user's specification of the instructions desired.

Further, the invention generates random test vectors which test the instructions which the user specified. For example, the user may specify that a "MEMORY READ" instruction be tested, and may specify a range of addresses for testing. The invention generates input vectors which read data from the range of addresses.

As another example, the user may specify a set of instructions, together with a range of parameters. ("Parameters" generally are the arguments which instructions need for their executions. The variables "662" and "6" in the "LOAD" instruction given above represent arguments.)

The invention generates a sequence of input vectors which execute the instructions, but selecting the parameters at random, thereby exercising functionality in the system in a manner which would not necessarily be foreseen by a designer.

Therefore, as explained so far, the invention simulates the operation of a microprocessor in a digital system in executing a series of instructions, by automated generation of the vectors, labeled "input vectors" 4 in FIG. 1. These input vectors are applied to a simulation of sub-system 3B.

This random generation is undertaken by a program given in the COMPUTER PROGRAM LISTING, attached.

Simulation of Sub-System

The simulation of sub-system 3B is a known process. The sub-system 3B is represented by individual logic blocks L1–L6, each of which produces digital output on data lines, indicated by the dashed arrows. The dots A through H label data lines, or busses.

In the general case, the simulation produces a record which tracks the logic states of all the data lines, as well as the logic states of the input vector 4, and produces a "trace file" 18, which reports a time-history of these logic states. FIG. 2 provides a generalized example of a trace file.

However, in the general case, the trace file probably contains more information than the user needs. The user is perhaps interested in only a selected group of the data lines, or busses. The invention allows the user to identify the selected group of data lines, or busses, and extracts the relevant output vectors from the trace file, as indicated by arrow 24 in FIG. 1. The invention, in effect, produces a reduced trace file 27, which contains a timehistory of the group of vectors of interest. These vectors are termed "primary output vectors," to distinguish them from "secondary output vectors," which will be described below.

As an example of primary output vectors, data busses A through H are indicated in sub-system 3B. A time-history of their signals is recorded in the trace file 18 by the simulation. However, the user may only be interested in busses A through D. The invention extracts the time-history of these busses, in order to isolate them from unwanted data, and, in effect, produces reduced trace file 27, which contains the output vectors of interest, termed the primary output vectors.

Simulation Checking

The invention uses the trace file 18 for a second purpose, in addition to extracting the primary output vectors. This additional purpose is perhaps best illustrated by two simplified examples.

EXAMPLE 1

Assume that locations A and B within sub-system 3B represent data within system memory. Assume that the user, in block 6 in FIG. 1, specifies that these data are to be swapped with each other. Block 9 then, for example, generates input vectors which cause the following events to occur:

1. Write data A into a temporary location.
2. Write data B into location A.
3. Read data A from the temporary location.
4. Write data A to location B.

In addition to simulating these four steps, the invention, as indicated in block 28, independently computes the values of the data which locations A and B are expected to contain, after the operation. This independently computed set of values are termed "secondary output vectors" in block 28.

The invention then compares the secondary output vector with the primary output vector, in block 30, which is obtained from the trace file. If they agree, the agreement is one indication that the simulated system 3B is functioning properly.

EXAMPLE 2

Assume that the data A represents data within a cache, and that the data B represents data within system memory. Assume that a cache controller is to be tested, by generating, in block 9, output vectors which cause the following events:

1. Copy data B into cache at location A. (Now A and B are identical.)
2. Change the data at location A. (Now A and B will be different.)
3. Initiate a write-back process, wherein the new data at A is copied to B. (Now A and B should again be identical.)

The invention performs a similar write-back, by way of a computer program, as indicated in block 28. The invention compares the primary and secondary vectors, to determine whether they match, and thus whether the simulated sub-system 3B is functioning properly.

With these two examples as background, the following characterization of the comparison undertaken by block 30 can be given.

The simulation of the sub-system 3B is, in general, quite detailed. For example, if a data word is to be loaded into a memory location, multiple steps are required. For example:

1. Select a memory location by placing an address to an address bus.
2. Latch the address.
3. Place a data word onto a data bus.
4. Latch the data word. Simulation of the sub-system 3B executes these steps.

However, the independent computation of block 30 does not become involved in the details of these steps (unless such involvement is desired). Instead, block 30, in a computer program, simply notes that a specific word is to be loaded into a specific address and, after the simulation completes the loading process, checks the loaded word, by checking the correctness of the vector representing the data at the address, within either the trace file 18, or the reduced trace file 27.

Restated, block 30 performs a high-level cross-check of results caused by the input vectors 4, rather than checking the details of the operation caused by these input vectors. Block 30 independently computes the results expected from the operations specified by the user in block 6. Block 30 then compares its computed results with those produced by the simulation by, in effect, comparing the reduced trace file 27 with the secondary output 28A.

This discussion will now consider several aspects of the invention.

Illustration of Input and Output Vectors

Figure 3:
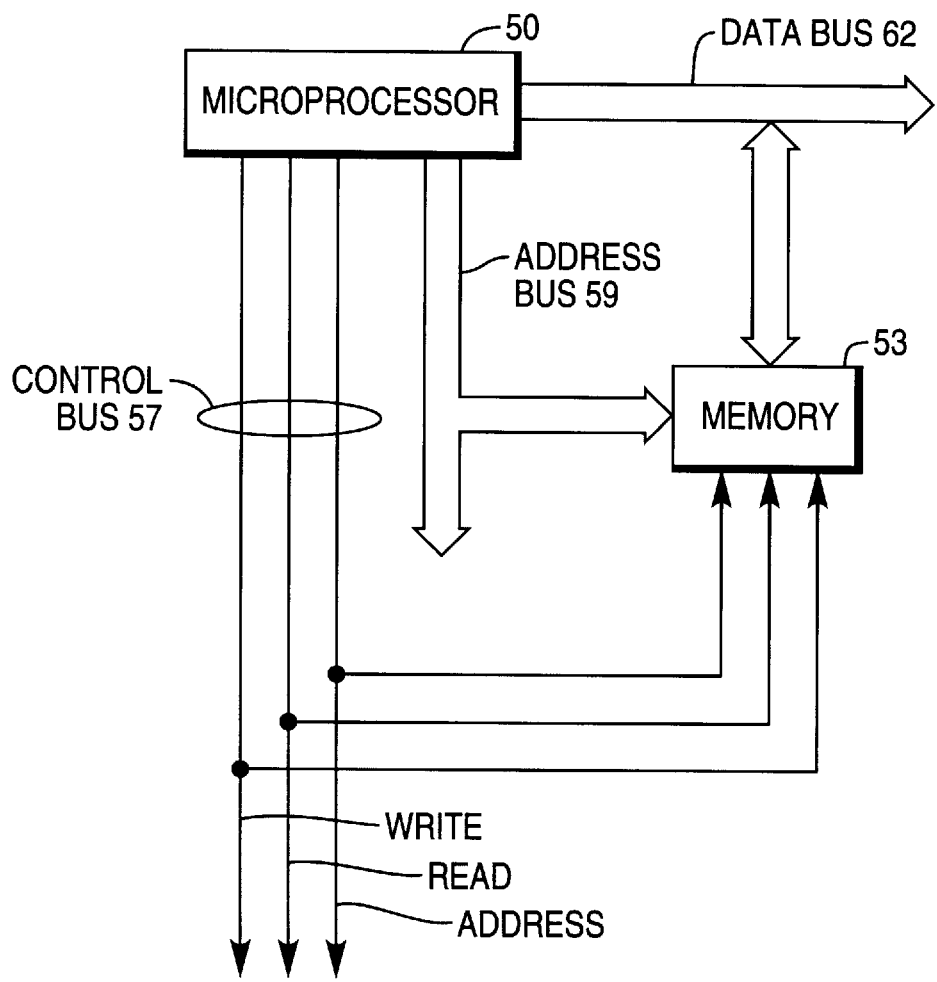
FIGS. 3 and 4 illustrate a simple computer architecture, for purposes of defining input and output vectors.

FIG. 3 illustrates a simple computer architecture, given for the purpose of illustrating input and output vectors. A generalized write operation will be discussed, wherein the microprocessor 50 writes a data word to memory 53. In doing so, the microprocessor 50 generates a sequence of input vectors. Each input vector consists of a combination of data bits on the control bus 57, the address bus 59, and the data bus 62.

Step 1. First, the microprocessor places the address of the memory location, where the data word is destined, onto the address bus 59. At this time, the three control lines ADDRESS, READ, and WRITE, are held HIGH. Also, the content of the data bus 62 does not matter at this time, because the memory is not responsive to the data bus at this time.

Therefore, the input vector consists of the data contained on the (a) address bus, (b) the control bus, and (c) the data bus, although, as stated above, the contents of the data bus do not matter at present.

Step 2. Next, the microprocessor pulls the ADDRESS line LOW, causing the memory 53 to latch the address data. Now the input vector has changed from Step 1, because the ADDRESS line is now LOW.

Step 3. Then, the microprocessor places the data word onto the data bus 62. The input vector has again changed from Step 2, because, now, known data has been applied to the data bus.

Step 4. Following this, the microprocessor pulls the READ line LOW, which orders the memory 53 to latch the data word present on the data bus, and store it. Again, the input vector has changed, because of the new value of the READ line.

Figure 4:
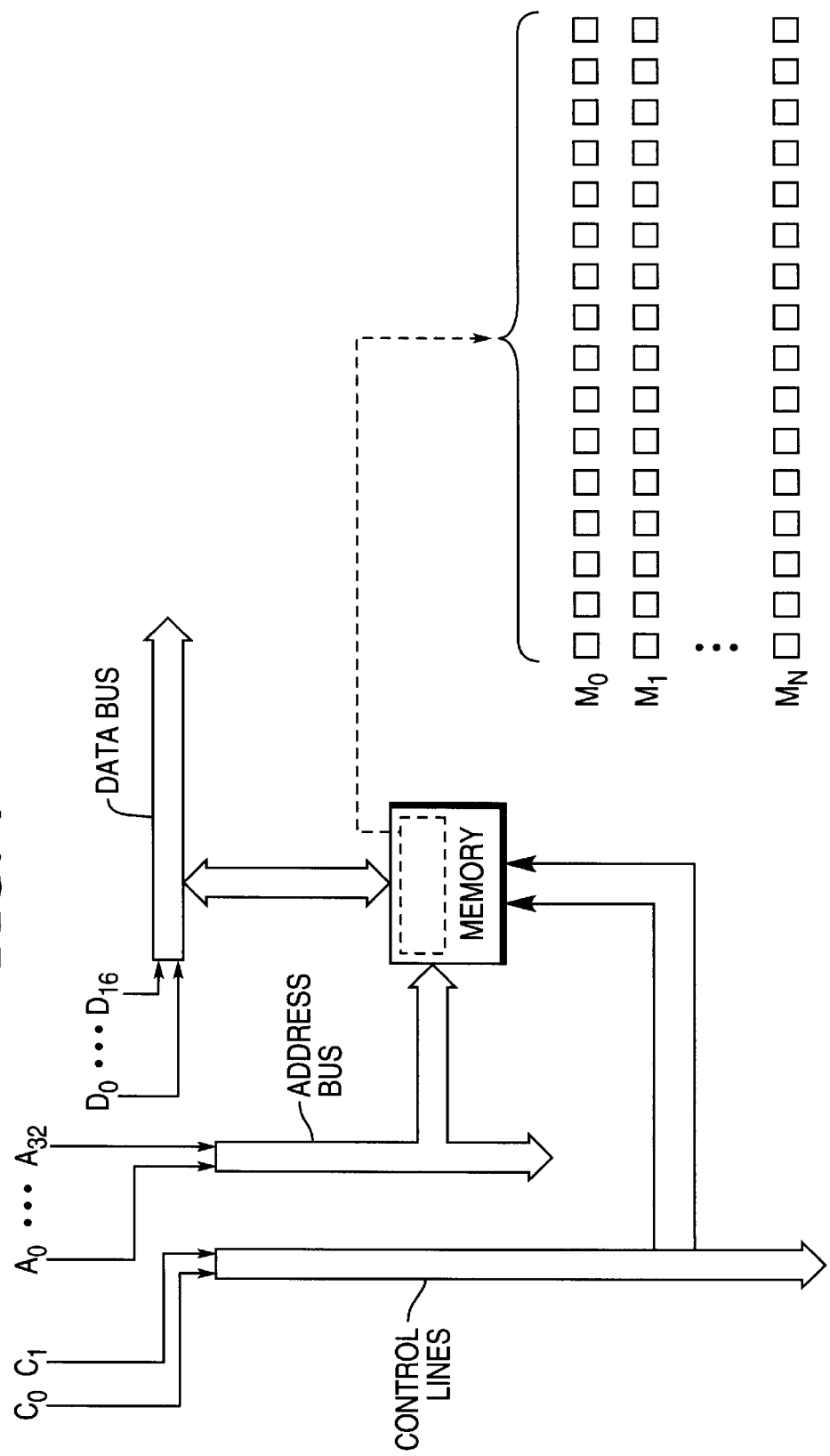

Therefore, this hypothetical write-operation illustrates a sequence of four input vectors. In the context of the invention, these input vectors are represented as arrow 4 in FIG. 1. The primary output vectors can be taken as the contents of the memory 53, illustrated in FIG. 4. Any selected memory locations, such as Ml, can be selected as an output vector.

As an example, this memory location, Ml, will assume the following values:

| Time | Value of M1 |
| --- | --- |
| Step 1 | Previous value (i.e., no change) |
| Step 2 | Previous value |
| Step 3 | Previous value |
| Step 4 | New value (i.e., data on data bus). |

Therefore, this example illustrates input vectors and output vectors in a simple digital system.

More Complex System

In practice, memory systems are associated with memory controllers. The memory controllers handle such tasks as a) latching the data on the address bus (which identifies the target memory address) when the ADDRESS line is pulled LOW;

b) creating a data path between (i) the data bus and (ii) the target memory address, for the data to follow;

c) and others.

The memory controller contains its own logic circuitry and data lines.

In principle, a memory controller can be represented by a system analogous to sub-system 3B in FIG. 1. In testing the simulated controller, the relevant vectors from the group A through H is selected, as discussed above.

One Embodiment

Figure 5:
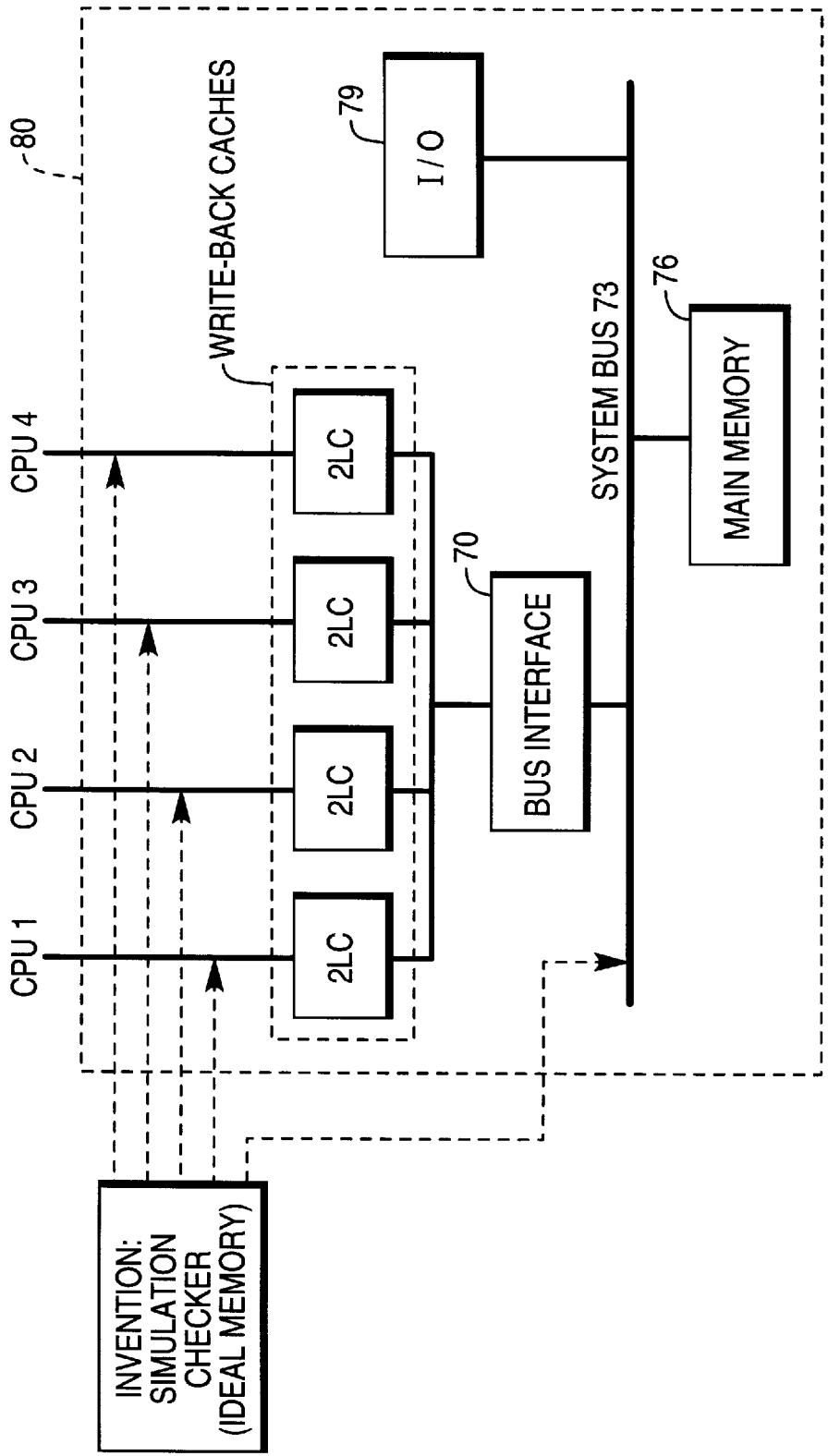
FIG. 5 illustrates a computer architecture which can be tested by the invention.

FIG. 5 illustrates one system to which the invention is applicable.

In the FIG., multiple CPUs (Central Processing Units, or microprocessors) are each equipped with a second-level cache (2LC). The caches 2LC interface with a bus interface 70, which connects to the system bus 73, which leads to main memory 76 and to Input/Output (I/O) devices 79. An example will illustrate one implementation of the invention.

Example

In FIG. 5, writeback caches are indicated. A processor CPU1 copies a data block A (not shown) from main memory, and loads it into its writeback cache. The processor then performs operations which alter the data, so that block A within the writeback cache 2LC no longer corresponds to block A within main memory. (This lack of correspondence is commonly called a "cache coherency" problem.)

A cache controller (not shown), at intervals determined by the system design, replaces block A within main memory with block A from the cache, thereby causing block A at both locations to correspond, and removing the cache coherency problem.

However, in another scenario, another processor CPU2 could have fetched the same block A from main memory and copied it into its cache, after P1 did likewise. The processors could have modified the blocks A differently.

The system must be designed to handle such problems. The invention, operating as described above, verifies whether the overall system functions as intended, and whether cache coherency has been maintained.

The invention generates input vectors corresponding to those generated by the CPUs. The invention simulates the apparatus indicated by dashed block 80. The invention takes as output vectors the appropriate memory addresses within the caches 2LC and the main memory 76. The invention independently computes, or predicts, how the contents of the caches and main memory should behave, and compares this predicted behavior with the appropriate output vectors indicated by the simulation, which are contained within the trace file.

Generation of Input Vectors

For a digital system of even moderate size, the number of possible input vectors approaches astronomical dimension. All possible vectors cannot be tested in a reasonable time, if at all.

The invention synthesizes a subset of the input vectors. Further, the subsets are designed to exercise selected functionality within the system. In a system taking the form of a digital computer, functionality can be defined as including all operations allowed by the instruction set of the microprocessor. The instruction set can be further classified into groups of related operations, as shown in Table 1.

TABLE 1

Instruction Set Classifications

| Operator Type | Examples |
| --- | --- |
| Arithmetic and Logical | Integer Arithmetic; Logical AND, OR. |
| Data Transfer | Load word from memory into processor; Write word from processor to memory. |
| Control | Branch, Jump, procedure call/return, jump. |
| System | Operating system call |
| Floating point | Floating point operations, e.g., addition, multiplication. |
| Decimal | Decimal operations, e.g., decimal addition, multiplication. |
| String | E.g.: string move, string compare. |

Within each classification, the Random Pattern Generation (RPG) program allows a range of parameters to be selected. For example, in the Data Transfer class, the RPG program allows the user to select, for example, a range of addresses to transfer data to, and from. As another example, the RPG program allows a user to select a combination of instructions from different classes, with different ranges for each.

In the general case, the RPG program allows a user to select one or more instructions from the instruction set. For each instruction, a range of parameters is selected (e.g., for a write instruction, a range of words to be written, and a range of addresses to be written to.) The invention generates the sequence of input vectors for each instruction set, and repeats the sequence, according to the range of parameters specified.

The invention does this randomly One aspect of this random generation is that a selected number of vectors is generated for a specified set of parameters, as indicated by block 6 in FIG. 1. For example, the user, in block 6, can state, in effect: "Store the value "1111 0000" into 100,000 memory locations within the memory space from 100 to 10,000,000." In response to this short statement, the invention generates a sufficient number of input vectors to accomplish the 100,000 storage operations.

The invention provides the algorithmic generation of large numbers of random test vectors, thereby providing several advantages. Under the invention, generation of, for example, one million test vectors requires (1) a minute or two for a human to type the commands requesting the million vectors, and (2) a few seconds for the computer to generate the vectors. In contrast, for a human to generate one million test vectors, unaided, would easily require five years, assuming generation of 100 vectors per hour.

In addition, since, under the invention, the vectors are generated by algorithms, no errors are expected (once the programming has been de-bugged). In the human-generated vector set, a significant amount of error is expected.

Also, the random characteristic of the vectors and the large number of vectors provides better coverage of the possible states of the system under test than a human could accomplish.

Example of Independent Verification

Figure 6:
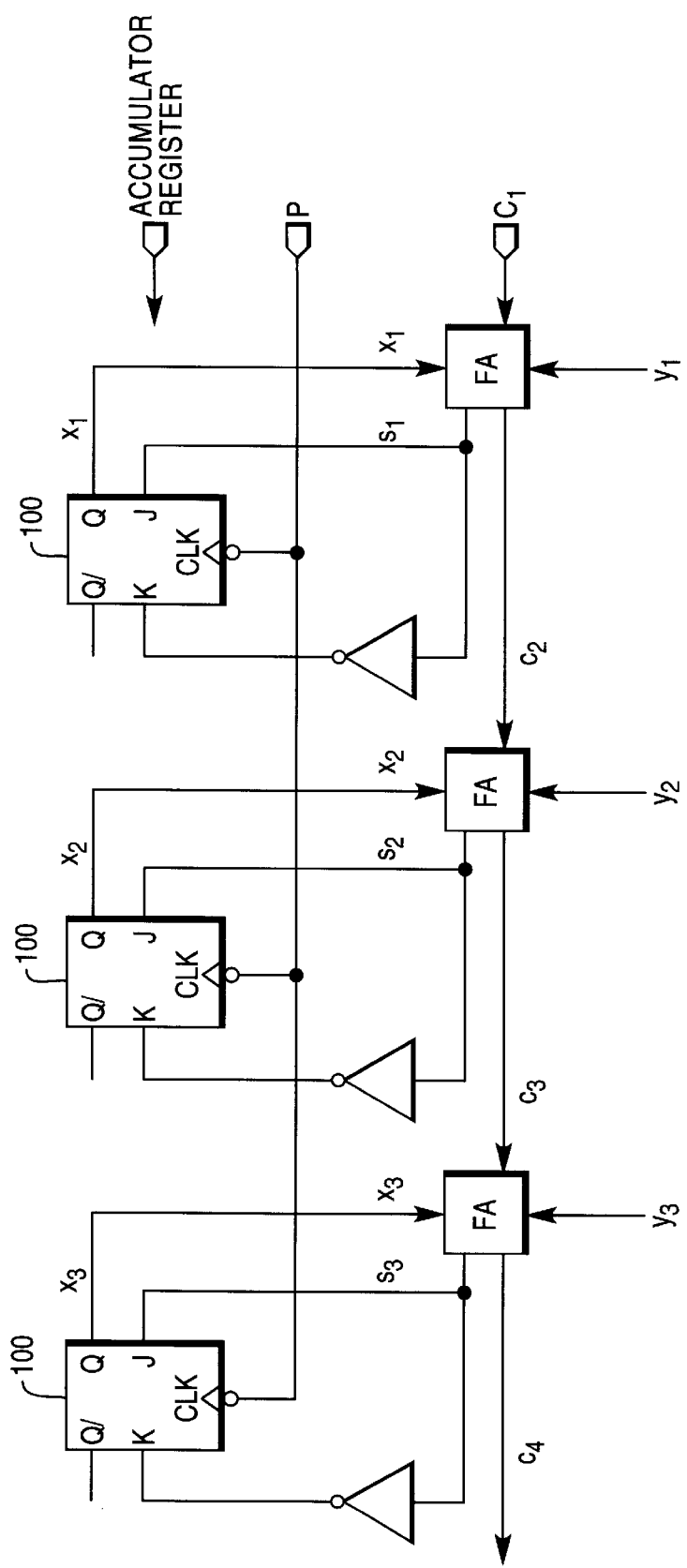
FIG. 6 illustrates a binary adder with accumulator.

FIG. 6 illustrates a very simply digital logic circuit, an adder-with-accumulator. The variables X (which includes $x_1$, $x_2$, and $x_3$) and Y (which includes $y_1$, $y_2$, and $y_3$) are added together, and the result is stored in an accumulator. X is the variable stored in the accumulator.

In operation, X is loaded into the JK flip-flops 100, by gates not shown. Y is applied to the lines so-labeled. When the pulse line P is pulled, X is added to Y, and the result appears at the Q output of the flip-flops.

FIG. 7 illustrates the independent verification which the invention undertakes. Block 105 represents the circuit of FIG. 6, but in synthesized, model form. Block 105 is analogous to block 38 in FIG. 1. The invention generates the appropriate test vectors X, Y, and P, in blocks 110 and 115 in FIG. 7, and applies them to the simulated circuit 105. The simulated circuit 105 produces output $S_A$. (Alternately, the Q outputs of the flip-flops 100 in FIG. 6 could be taken as output.)

The invention also independently computes the expected output, as by using X and Y as input variables to a computer program written in the C language, as indicated in block 122. The program computes X+Y, and produces output $S_B$.

Then, the invention compares outputs $S_A$ with $S_B$. If they are identical, it is assumed that the simulated logic 105 is functioning properly.

Block 122 is completely independent of simulation block 105, although, of course, they can possibly run on the same computer. The computation of block 122 is considered to be error-free, once the program contained therein has been de-bugged. In contrast, the simulation block 105 may contain errors, which block 122 will detect.

Restated, if the simulated output vector $S_A$ and the predicted output vector $S_B$ disagree, the disagreement is taken to indicate an error in block 105, rather than an error in block 122 (because block 122 is assumed to be error-free, or at least containing fewer errors than block 105). Conversely, if the two output vectors agree, the agreement is taken as confirmation that block 105 is functioning properly.

Therefore, from one point of view, the operation of block 122 is taken as a benchmark, against which the output of block 105 is compared.

Computing Extent of Test of Simulated Logic

The invention can compute the extent to which the simulated logic has been tested. Several measures of the extent are possible.

One measure is based on exhausting all possible input vectors 4. As a very simple example, if the input vectors are 8 bits in length, then $2^8$, or 256, possible input vectors are possible. Testing every one exhausts all possibilities. Testing 128 represents testing fifty percent of the possibilities.

Another measure is based on exhausting all possible sequences of input vectors. As a very simple example, if the input vector is three bits in length, then $2^3$, or 8, vectors are possible. However, if a sequence of ten vectors is considered, the sequence contains $8^8$ possibilities, a very large number. The invention is programmed to count the actual number of sequences generated, and compare that number with the $8^8$ possibilities.

Another measure is based on the number of logic gates contained within the simulation 38 in FIG. 1 are actually given controlled input.

Definitional Matters

"Vector." The informational content of a digital word, such as 1100, depends on the context within which the word is used. In some contexts, the word 1100 can represent a binary number, having the decimal equivalent of 12. In another context, every digit of the word can represent a different type of information.

For example, in 1100, the "11" can be signals applied to a control bus, while the "00" can represent data, as in FIG. 3. In such a case, the word represents multi-dimensional data, and has the form of a vector, just as the triplet (1, 2, 3) can represent a vector in Cartesian coordinates.

"Digital system." For present purposes, there is no substantial difference between a digital system which is implemented in software (such as a simulation) or in hardware. That is, the invention examines the transfer function, or the dependencies of the output vectors on the input vectors. The dependencies are the same, whether the system is implemented in hardware or software.

Significant Features

The simulations discussed above can be implemented using a Hardware Description Language (HDL) simulator. Such simulators are known in the art. One simulator is available from Synopsys, located in Mountain View, Calif.

A COMPUTER PROGRAM LISTING is attached. This LISTING contains code which implements the Random Pattern Generation and the Simulation Checker Program, discussed above.

Numerous substitutions and modifications can be undertaken without departing from the spirit and scope of the invention as described herein. What is desired to be secured by Letters Patent is the invention as defined in the following claims.

We claim:

1. In a computer simulation of a digital system, which produces a trace file which contains output vectors indicative of states of the system, the improvement comprising:
   a) extracting a set of primary vectors from the output vectors, which primary vectors comprise a reduced set of the output vectors; and
   b) deriving secondary vectors from data contained within the trace file, through a procedure independent of said simulation; and
   c) comparing secondary vectors with primary vectors.

2. Apparatus for analyzing a digital system which receives input vectors, and produces output vectors, comprising:
   a) means for generating a set of input vectors, without human intervention;
   b) simulation means, for simulating operation of the digital system, which
      i) accepts the input vectors and
      ii) produces first output vectors, based on the input vectors;
   c) analysis means, which
      i) accepts the input vectors;
      ii) predicts response of the digital system to the input vectors,
      iii) produces second output vectors, indicative of the response; and
      iv) compares the first and second output vectors.

3. In the simulation of a digital system, wherein a record of vectors produced by the system are stored in a trace file, the improvement comprising:
   a) extracting from the trace file a subset of vectors;
   b) independent of the simulation, deriving predicted values of the subset of the vectors; and
   c) comparing the predicted values with the subset.

4. Improvement according to claim 3, and further comprising the step of
   d) identifying vectors in the subset which fail to match the predicted values.

5. Improvement according to claim 3, and further comprising the step of:
   d) estimating fraction of logic gates of the digital system which were tested.

* * * * *